United States Patent [19]

Lewis, Jr. et al.

[11] Patent Number: 4,470,069
[45] Date of Patent: Sep. 4, 1984

[54] REDUCED DATA RATE DIGITAL COMB FILTER

[75] Inventors: Henry G. Lewis, Jr., Hamilton Square; Thomas V. Bolger, Camden, both of N.J.

[73] Assignee: RCA Corporation, New York, N.Y.

[21] Appl. No.: 405,031

[22] Filed: Aug. 4, 1982

[51] Int. Cl.³ .......................................... H04N 9/535
[52] U.S. Cl. ...................................................... 358/31
[58] Field of Search ........................................ 358/31

[56] References Cited

U.S. PATENT DOCUMENTS

| | | | |
|---|---|---|---|
| 3,858,240 | 12/1974 | Golding et al. | 358/13 |
| 4,096,516 | 6/1978 | Pritchard | 358/31 |
| 4,218,700 | 8/1980 | Kashigi | 358/31 |
| 4,322,739 | 3/1982 | Drewery et al. | 358/13 |
| 4,400,718 | 8/1983 | Lee | 358/13 |

FOREIGN PATENT DOCUMENTS

| | | |
|---|---|---|
| 3028705 | 3/1978 | Fed. Rep. of Germany . |
| 1595780 | 6/1972 | United Kingdom . |
| 2050746A | 1/1981 | United Kingdom . |

OTHER PUBLICATIONS

IEEE Journal of Solid–State Circuits, vol. SC–16, No. 3, 6/81, New York, Harry J. M. Veedrick, "An NMOS Dual–Mode Digital Low–Pass Filter for Color TV", pp. 179–182, (FIG. 3, p. 179).

Proceedings of the IEEE, vol. 69, No. 3, Mar. 1981, New York, R. E. Crochiere and L. R. Rabiner, "Interpolation and Decimation of Digital Signals–A Tutorial Review", pp. 300–331.

"Sub-Nyquist-Encoded PCM NTSC Color Television", by John P. Rossi, pub. in Jan. 1976, SMPTE Journal, vol. 85, No. 1.

"A Discussion of Sampling Theorems", by D. A. Linden, pub. in Jul. 1959, Proceedings of the IRE.

"Digivision", ITT Semiconductor Development Data, Aug. 1982.

T. Fischer, "What is the Impact of Digital TV", IEE Transactions on Consumer Electronics, vol. CE–28, No. 3, Aug. 1982, pp. 423–429.

Exhibit "A", Digit 2000 VLSI Digital TV System", ITT Semiconductor (Confidential).

Primary Examiner—Richard Murray
Attorney, Agent, or Firm—Eugene M. Whitacre; Paul J. Rasmussen; Eric P. Herrmann

[57] ABSTRACT

A comb filter arrangement operating at a reduced data rate is provided, which requires comparably fewer storage locations than previous arrangements. A digitized composite video signal of a given codeword rate is applied to a bandpass filter, which produces a filtered signal restricted to a portion of the passband of the composite video signal. The filtered signal is then sub-sampled at a rate which satisfies the Nyquist criterion for information of the restricted passband. Codewords, now at a reduced data rate, are applied to a one-H delay line, and delayed and undelayed signals are combined to produce a first comb-filtered signal. The first comb-filtered signal is then applied to an interpolator, which provides a sequence of codewords at the codeword rate of the original digitized composite video signal. This sequence of codewords is then combined with the codewords of the composite video signal to produce a second comb-filtered signal.

12 Claims, 36 Drawing Figures

REDUCED DATA RATE DIGITAL COMB FILTER

This invention relates to signal separation systems and, in particular, to a comb filter arrangement for separating the luminance and chrominance components of a digitized video signal at a reduced data rate.

Conventional television broadcast systems are arranged so that much of the brightness (luminance) information contained in an image is represented by signal frequencies which are concentrated about integer multiples of the horizontal line scanning frequency. Color (chrominance) information is encoded and inserted in a portion of the luminance signal spectrum around frequencies which lie halfway between the multiples of the line scanning frequency (i.e., at odd multiples of one-half the line scanning frequency).

Chrominance and luminance information can be separated by appropriately combing the composite signal spectrum. Known combing arrangements take advantage of the fact that the odd multiple relationship between chrominance signal components and half the line scanning frequency causes the chrominance signal components for corresponding image areas on successive lines to be 180° out of phase with each other. Luminance signal components for corresponding image areas on successive lines are substantially in phase with each other.

In a comb filter system, one or more replicas of the composite image-representative signal are produced which are time delayed from each other by at least one line scanning interval (a so-called one-H delay). The signals from one line are added to signals from a preceding line, resulting in the cancellation of the chrominance components, while reinforcing the luminance components. By subtracting the signals of two successive lines (e.g., by inverting the signals of one line and then combining the two), the luminance components are cancelled while the chrominance components are reinforced. Thus, the luminance and chrominance signals may be mutually combed and thereby may be separated advantageously.

The composite video signal may be comb filtered in an analog form, a sampled data form, or a digital form. Comb filters using analog signal glass delay lines for the (approximately) one-H delay lines are commonly employed in PAL-type receivers to separate the red and blue color difference signals, taking advantage of the one-quarter line frequency offset of the interlacing of the two signals. An example of a comb filter system for a sampled data signal is shown in U.S. Pat. No. 4,096,516, in which the delay line comprises a 682½ stage charge-coupled device (CCD) delay line which shifts signal samples from stage to stage at a 10.7 MHz rate to achieve a one-H delay. The article "Digital Television Image Enhancement" by John P. Rossi, published in Volume 84 of the Journal of the Society of Motion Picture and Television Engineers (1974) beginning at page 37 shows a digital comb filter in which the one-H delay is provided by a digital storage medium for 682 codewords which is accessed at a 10.7 MHz rate.

In the CCD delay line described in the above-referenced U.S. patent, 682½ stages are needed to transfer charge packets related to the analog video signal. But in the digital delay line described in the Rossi article, the video signal is in the form of eight-bit digital codewords. This arrangement requires the use of eight storage locations for each of the 682 codewords in a horizontal line, or a storage medium for 5,456 bits. Moreover, this delay line is only of sufficient size for a system in which an NTSC color video signal is sampled at a rate of three times per subcarrier cycle (i.e., using a 10.738635 MHz sampling signal). A frequently discussed sampling frequency for digitizing the analog video signal is 14.3181818 MHz, or four times the color subcarrier frequency. A one-H digital delay line operating at this frequency requires storage for 910 codewords which, at eight bits per codeword, requires a total of 7280 storage locations. Since a storage medium of this capacity is difficult to fabricate economically, it is desirable to provide a digital comb filter system which requires fewer storage locations.

In accordance with the principles of the present invention, a comb filter arrangement operating at a reduced data rate is provided, which requires comparably fewer storage locations than previous arrangements. A digitized composite video signal of a given codeword rate is applied to a bandpass filter, which produces a filtered signal restricted to a portion of the passband of the composite video signal. The filtered signal is then subsampled at a rate which satisfies the Nyquist criterion for information of the restricted passband. Codewords, now at a reduced data rate, are applied to a one-H delay line, and delayed and undelayed signals are combined to produce a first comb-filtered signal. The first comb-filtered signal is then applied to an interpolator, which provides a sequence of codewords at the codeword rate of the original digitized composite video signal. This sequence of codewords is then combined with the codewords of the composite video signal to produce a second comb-filtered signal.

In the drawings:

FIGS. 2 and 3a and b illustrates in block diagram form bandpass filters suitable for use in the comb filter system of FIG. 1;

FIGS. 6a–i is a timing diagram showing the instantaneous signal contents at points in the arrangements of FIGS. 2, 4 and 5;

FIGS. 8a–h and 10a–k depict waveforms illustrating the operation of the clock signal generating arrangement of FIGS. 7 and 9.

Figure 1:
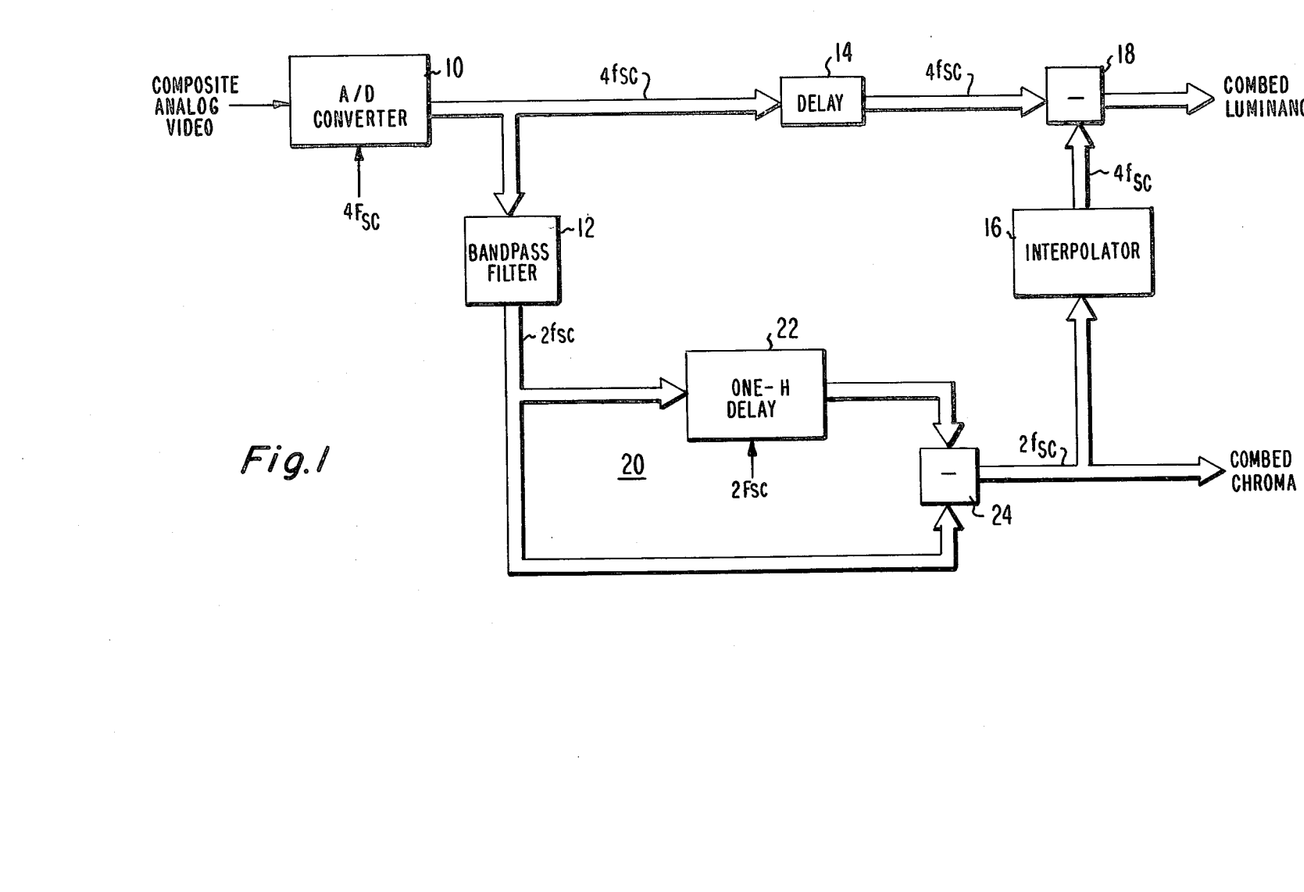
FIG. 1 illustrates in block diagram form a digital comb filter system constructed in accordance with the principles of the present invention.

Referring to FIG. 1, a comb filter system constructed in accordance with the principles of the present invention is shown. In FIG. 1, single-line arrows represent paths for individual signals, and broad arrows represent data paths for multibit digital codewords.

In FIG. 1, a composite analog video signal is applied to the input of an analog-to-digital (A/D) converter 10. The A/D converter samples the analog video signal in response to a sampling signal ($4f_{sc}$) and produces digital video codewords at the sampling signal frequency. In the embodiment of FIG. 1, the sampling signal frequency $4F_{sc}$ is equal to four times the color subcarrier frequency, where $f_{sc}$ is the color subcarrier frequency.

In the NTSC color television system in which the color subcarrier frequency is 3.579545 MHz, the $4f_{sc}$ sampling signal frequency is 14.31818 MHz.

The $4f_{sc}$ rate digital codewords produced by the A/D converter 10 are applied to inputs of a delay stage 14 and a digital bandpass filter 12. The passband of the bandpass filter 12 includes the chrominance frequencies which are distributed about the 3.58 MHz color subcarrier frequency in the NTSC system. The delay stage 14 provides an equalizing delay which matches the delays encountered by signals between the input of the bandpass filter 12 and the output of an interpolator 16.

The bandpass filter 12 produces filtered output signals at a clock rate which is lower than that of the input signals to the filter. This may be accomplished, for example, by subsampling the output signals produced by the filter. In the embodiment of FIG. 1, the bandpass filter 12 produces output signals at a $2f_{sc}$ rate, which is half the rate of the input signals to the filter. The $2f_{sc}$ rate of the filtered signals satisfies the Nyquist sampling criterion for the bandwidth of the information-bearing filtered signals.

The $2f_{sc}$ rate filtered signals are applied to a comb filter 20. The comb filter 20 includes a one-H delay line 22, also clocked at the $2f_{sc}$ signal rate, and a subtractor 24. The filtered signals passed by the one-H delay line are applied to one input of the subtractor 24, and undelayed filtered signals are applied to the second input of the subtractor. The subtractor 24 will therefore produce comb filtered chrominance signals at a $2f_{sc}$ clock rate. The comb filtered chrominance signals are now in a form suitable for further processing and display.

The comb filtered chrominance signals are also applied to the input of an interpolator 16. The interpolator 16 interpolates the $2f_{sc}$ chrominance codewords to produce signal values intermediate the $2f_{sc}$ codewords. The output signal of the interpolator thereby comprises combed chrominance signal codewords at the $4f_{sc}$ codeword rate. These $4f_{sc}$ rate combed chrominance signals are applied to one input of a subtractor 18, which also receives $4f_{sc}$ rate codewords passed by the delay stage 14. The subtractor 18 subtracts the comb filtered chrominance codewords from the composite signal codewords passed by the delay stage 14 to produce comb filtered luminance signal codewords. The comb filtered luminance signal is available at the output of the subtractor 18 for subsequent luminance information processing.

The arrangement of FIG. 1 is advantageous in that the comb filter 20 operates at a lower data rate than that of the composite signal produced by the A/D converter 10. This means that the one-H delay of the delay line 22 can be provided by a 455 stage delay line for NTSC signals, instead of the 910 stage delay line required for a $4f_{sc}$ data rate. For example, if the comb filter processes eight bit filtered codewords, only 3640 storage locations are needed in the one-H delay line instead of the 7280 locations required for a $4f_{sc}$ comb filter. The $2f_{sc}$ rate comb filtered chrominance signals are then interpolated back up to the composite signal rate of $4f_{sc}$ and subtracted from the composite signal codewords to produce a comb filtered luminance signal.

Figure 2:
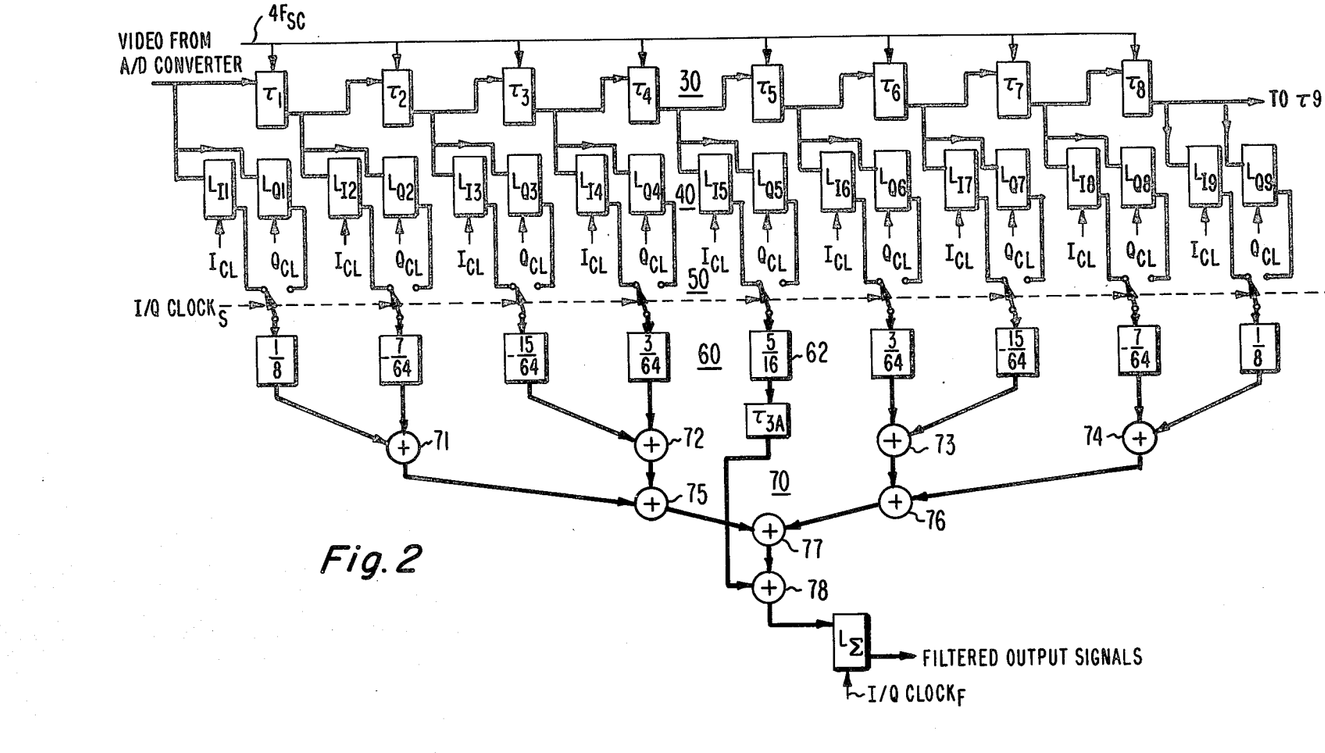
Figure 4:
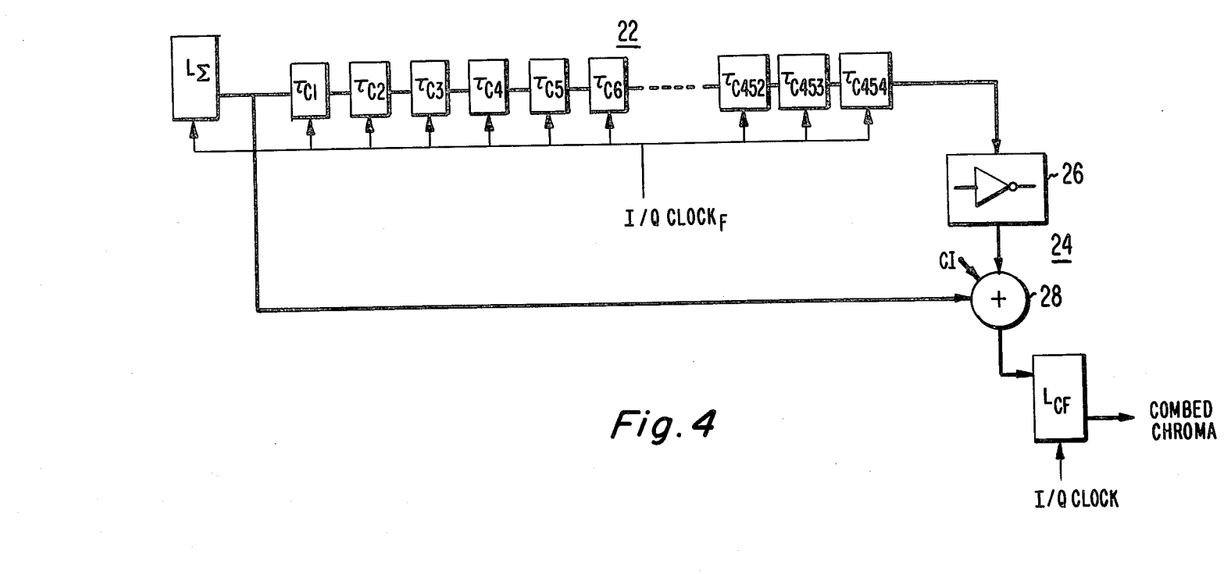
FIG. 4 illustrates in block diagram form a digital comb filter constructed in accordance with the principles of the present invention.
Figure 5:
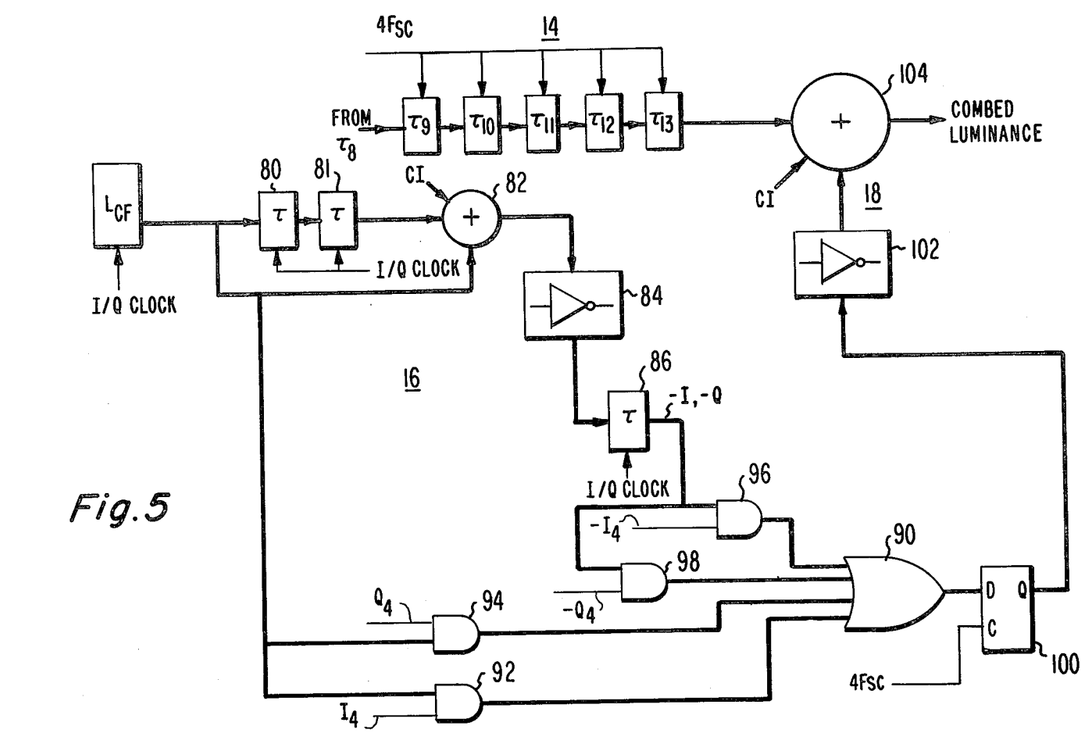
FIG. 5 illustrates in block and logic diagram form an interpolator suitable for use in the arrangement of FIG. 1.

A digital bandpass filter suitable for use as bandpass filter 12 in the embodiment of FIG. 1 is shown in detail in FIG. 2. In FIGS. 2, 4, and 5, broad lines depict data paths for multibit codewords and thin lines depict clock signal paths.

Composite video signals produced by the A/D converter 10 are applied to the input of the first stage of an eight-stage shift register 30, including delay stages $\tau_1$ through $\tau_8$. Each delay stage is clocked by a $4f_{sc}$ clock signal so as to store a multibit codeword for one cycle of the $4F_{sc}$ clock signal. For instance, if the codewords are eight bits in length, each delay stage will contain eight bits of information. The video signal codewords are clocked sequentially through the register 30, with output signals from the last stage $\tau_8$ being applied to a delay stage $\tau_9$ of the delay stage 14 of FIGS. 1 and 5. In addition, the input of the first stage $\tau_1$ and the outputs of the remaining stages are coupled to inputs of data latches of a latch register 40.

The latch register 40 includes nine $L_I$ latches labelled $L_{I1}$ through $L_{I9}$, and nine $L_Q$ latches labelled $L_{Q1}$ through $L_{Q9}$. The $L_I$ and $L_Q$ latches are arranged in pairs at the outputs of the shift register stages, with latches $L_{I1}$ and $L_{Q1}$ having their inputs coupled to the input of shift register stage $\tau_1$, latches $L_{I2}$ and $L_{Q2}$ having their inputs coupled to the input of shift register stage $\tau_2$, and so forth. The $L_I$ latches are loaded in parallel by a clock signal $I_{CL}$, and the $L_Q$ latches are loaded in parallel by a second clock signal $Q_{CL}$. The $I_{CL}$ and $Q_{CL}$ clock signals in this embodiment are each of the same frequency, $f_{sc}$, but are of different phases.

The video signal codewords held in the latches 40 are applied to inputs of weighting function circuits 60 by a multiplexer 50. The multiplexer 50, representatively shown in FIG. 2 as an array of switches, alternately couples the outputs of the $L_I$ and $L_Q$ latches to inputs of the weighting function circuits 60. The multiplexer 50 is switched by an I/Q CLOCK$_S$ signal at a $2f_{sc}$ rate. The weighting function circuits weight the applied signals by respective weights of $\frac{1}{8}$, $-7/64$, $-15/64$, $3/64$ and $5/16$ as shown in the FIGURE. The weighting function circuits may be constructed using shift matrices and adders as described in U.S. patent application Ser. No. 363,827 entitled "Digital Filter Circuits", filed Mar. 31, 1982 by Lauren A. Christopher.

Weighted signal samples produced by the weighting function circuits 60 are applied to an adder tree 70, which sums all of the weighted codewords at the output of the last adder 78 of the adder tree. The output signal of each weighting function circuit except for the center circuit 62 passes through four adders in the tree to reach the output of adder 78. The output of the center circuit 62 passes through only one adder 78, and thus will normally arrive at the output of adder 78 ahead of the other samples of a corresponding point in time. In order to bring the center circuit samples into the same time relationship as the other samples, a delay $\tau_{3A}$ equal to the delay of three adder tree adders is inserted in the signal path at the output of the center weighting function circuit. The weighted codewords will thereby be summed in the proper time relationship at the output of the final adder 78. The summed signal samples at the output of adder 78 are then latched into an output latch $L_\Sigma$, which produces filtered output signals at the I/Q clock rate of $2f_{sc}$.

Figure 6:
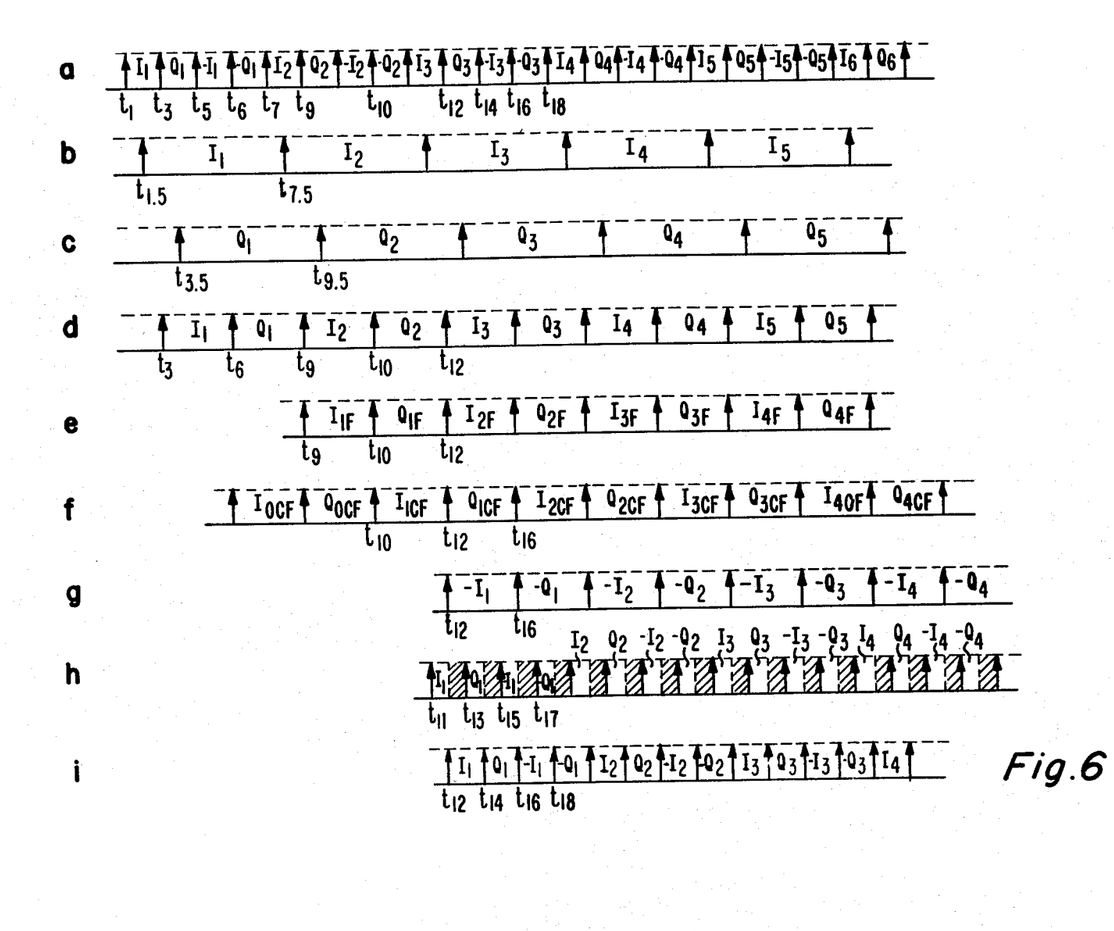

The operation of the bandpass filter of FIG. 2 is explained with reference to FIG. 6, which depicts the sequence of operation of the filter. FIG. 6a illustrates the contents of the shift register 30. Composite video signal samples, identified as $I_1$, $Q_1$, $-I_1$, $-Q_1$, etc. are shifted through the register 30 at a $4f_{sc}$ rate. The arrows in FIG. 6a indicate the times at which the register is clocked to shift the data. After four shifts, the first sample $I_1$ has been clocked into the $\tau_4$ stage. At that time, $t_1$, succeeding samples $Q_1$, $-I_1$, and $-Q_1$ are located in shift register stages $\tau_3$, $\tau_2$ and $\tau_1$, respectively. Preceding signal samples are stored in stages $\tau_5$ through $\tau_8$. One-half cycle of the $4F_{sc}$ clock later, at time $t_{1.5}$, the contents of the shift register 30 is loaded into the $L_I$ latches by the $I_{CL}$ clock. FIG. 6b illustrates the contents of latch $L_{I5}$, which now holds codeword $I_1$. It follows that latch $L_{I4}$ now holds codeword $Q_1$, latch $L_{I3}$ holds codeword $-I_1$, and so forth.

At time $t_3$, the shift register 30 is again clocked so that codeword $Q_1$ is now located in stage $\tau_4$. One-half cycle of the $4F_{sc}$ clock later, at time $t_{3.5}$, the codewords held in the shift register are loaded into the $L_Q$ latches. FIG. 6c illustrates the contents of latch $L_{Q5}$, which contains codeword $Q_1$ following time $t_{3.5}$.

The shift register 30 and latches 40 continue to be clocked in this manner. After three $4F_{sc}$ clock cycles $t_5$, $t_6$ and $t_7$, codeword $I_2$ is located in stage $\tau_4$ and the $L_I$ latches are reloaded at time $t_{7.5}$. The shift register is shifted again at time $t_9$ and the $L_Q$ latches are loaded at time $t_{9.5}$.

The multiplexer 50 directs the codewords from the latches 40 to the weighting function circuits at a $2f_{sc}$ clock rate, as shown in FIG. 6d. From time $t_3$ to time $t_6$ the $L_I$ latches are connected to the inputs of the weighting function circuits by the multiplexer. From time $t_6$ to time $t_9$ the $L_Q$ latches are connected to the weighting function circuits. The multiplexer continues to alternate between the latches at this $2f_{sc}$ rate.

The sampled codewords now propagate through the weighting function circuits 60 and the adder tree 70 to the output of adder 78. Since adders can be expected to exhibit appreciable propagation delay as compared to other circuit elements, such delay must be taken into consideration in the operation of the bandpass filter. For purposes of illustration, it will be assumed that the weighting function circuits exhibit propagation delays of 66 nanoseconds, and that each adder exhibits a propagation delay of 40 nanoseconds. Thus, each signal experiences a delay of 226 nanoseconds as it passes from the output of the multiplexer 50 through a weighting function circuit and four adder delays. For instance, signals held in latches $L_I$ are coupled through the multiplexer at time $t_3$, but do not arrive at the output of adder 78 for 226 nanoseconds, which is a time preceding time $t_9$ by approximately 54 nanoseconds. Therefore, by time $t_9$ the signal at the output of adder 78 has had 54 nanoseconds to settle, and is then clocked into latch $L_\Sigma$ at time $t_9$. It is seen that five cycles of the $4f_{sc}$ shift register clock ($t_1$-$t_9$ in FIG. 6a) elapse before the filtered signal sample $I_{1F}$ corresponding to sample $I_1$ is produced at the output of the bandpass filter, as shown in FIG. 6e. This delay time is taken into consideration in the selection of the equalizing delay 14 in FIGS. 1 and 5. An alternate bandpass filter design is shown in FIG. 3. In this arrangement, the filter delay stages as well as the computational elements are operated at a reduced rate. It will be appreciated that structurally differing FIR filters will produce similar FIR filter functions provided they operate to produce the same sum of sequential samples $\Sigma x(n-i)k_i$ in the same time sequence. The circuitry necessary to produce this result requires apparatus to successively store applied signal samples and route the requisite samples to the coefficient multipliers in the necessary sequence.

Figures 3A, 3B:
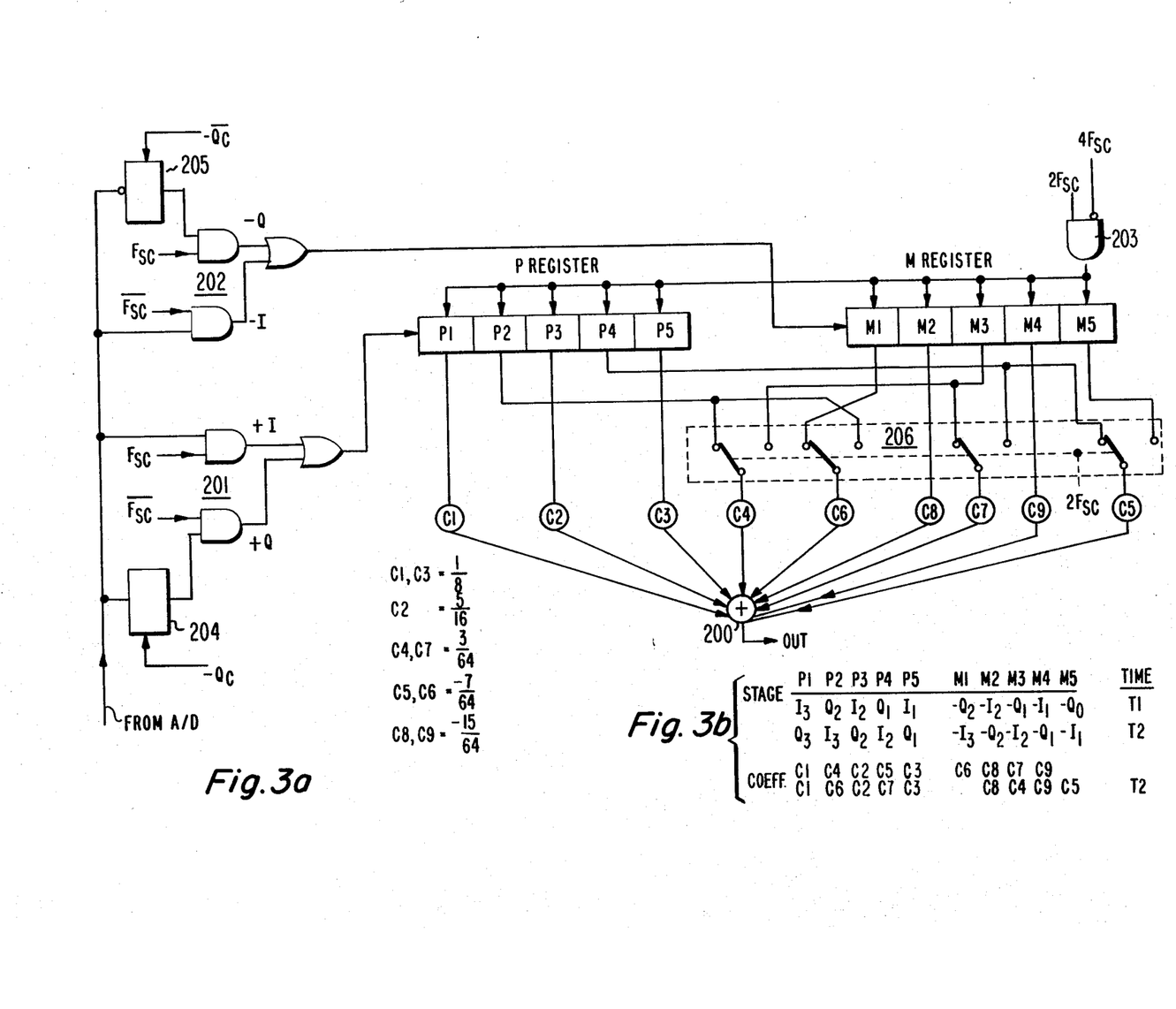

The FIG. 3 filter circuitry accomplishes this result by applying the input signal samples in an alternating mode to two separate delay registers P and M which operate at half the sample rate. The coefficient multipliers are respectively interconnected to process input signal samples in the same sequence as like coefficient multipliers process the samples in the FIG. 2 filter to generate $+I$ and $+Q$ filtered samples. The output products are applied to a summing circuit 200 which may be similar to the adder tree 70 in FIG. 2. The FIG. 3a filter does not require the output signal to be processed through an output latch $L_\Sigma$ as does the FIG. 2 circuit to expand the two filtered output samples over the time period of the four input samples.

In FIG. 3a the FIR filter includes a "P" register having five cascaded delay stages, P1-P5, into which the positive I and Q samples are successively loaded. A "M" register including five delay stages M1-M5 is loaded with successive "minus" I and Q input samples. Each of the delay stages of the P and M registers have output taps for applying delayed signal samples to the respective weighting circuits C1-C9. Certain ones of the weighting circuits are connected directly to the register tap points while others are multiplexed between tap points on the two registers at one half the input sample rate by a multiplexer or switch circuit 206.

FIG. 3b is a state table showing the states of the particular register stages P1-P5 and M1-M5 for a time T1, and the time T2 which corresponds to the time T1 plus one data shift by the registers. The two rows of values $C_i$ correspond to the respective weighting circuits connected to the respective register stage in the particular columns for times T1 and T2. With reference to FIG. 3b, FIG. 2 and FIG. 6, it will be seen that the particular samples of this sequence of nine samples in the P and M registers are applied to like coefficient multipliers as the first sequence of nine samples in the FIG. 2 filter circuit (as well as all succeeding sets of nine samples). Thus, on a sample by sample basis, the filter functions of the FIGS. 2 and 3a filters are the same.

Loading of the P and M registers is controlled by the signal sampling circuits 201 and 202 respectively, and the register clocking pulses generated by gate 203. The sampling circuits apply all of the positive I and Q signal samples to the P register and all of the negative I and Q samples to the M register. Because the two registers operate in parallel, they can be operated at $\frac{1}{2}$ the input sample rate. However, because two successive samples at the $4f_{sc}$ rate are alternately applied to each register i.e., $+I$ and $+Q$ to register P then $-I$ and $-Q$ to register M, each second sample (the $\pm Q$ samples) must be temporarily latched (204,205) before application to the respective register so that data is not lost.

Figure 8:
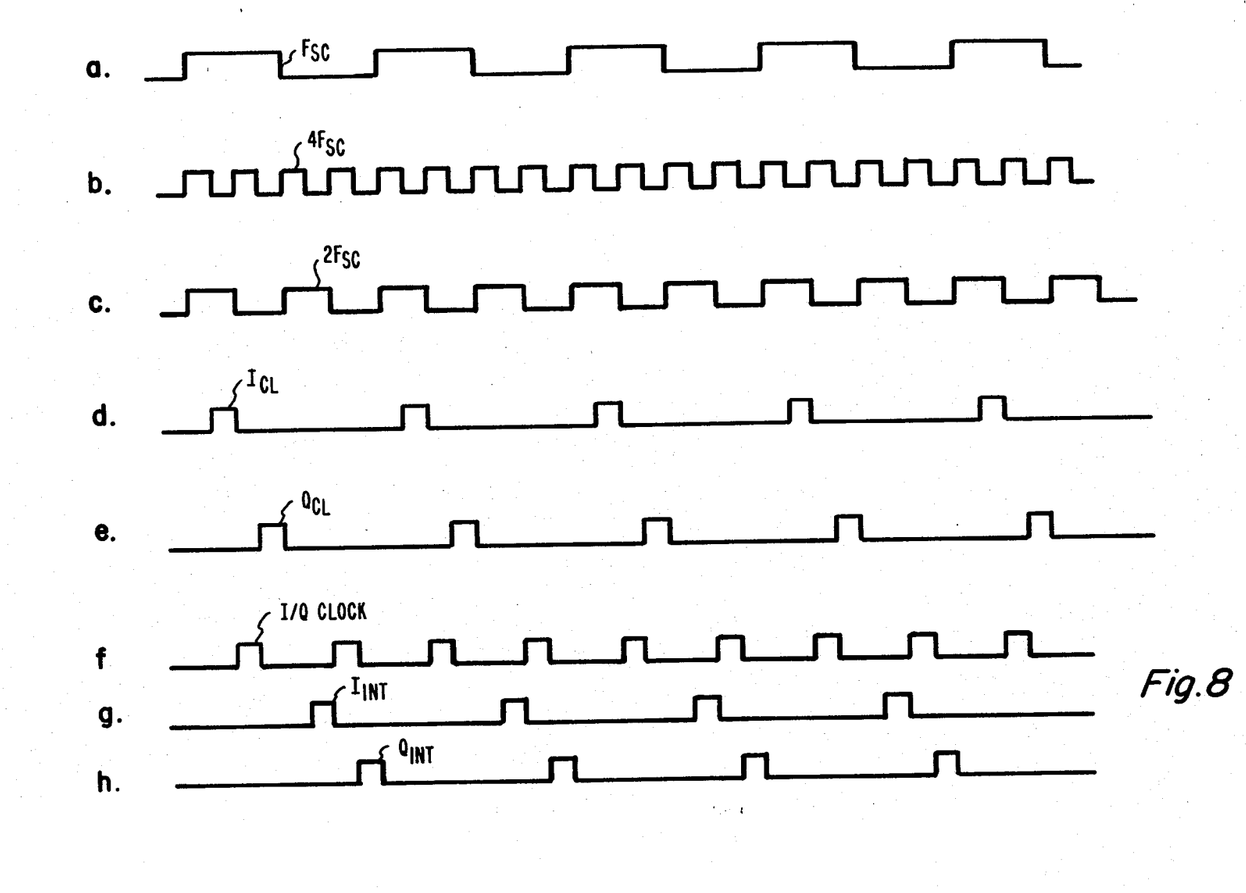

The timing of the clocking signals applied to sampling circuits 201 and 202 is illustrated in FIG. 8. A detailed discussion of the operation of the FIG. 3a type filter may be found in U.S. patent application Ser. No. 405,173 entitled "Decimating and Demodulating FIR Filters As For TV Chroma Signals" by H. G. Lewis Jr., filed concurrently herewith and assigned to the same assignee as the present invention.

In FIG. 4, the comb filter 20 of FIG. 1 is shown in further detail. The output latch $L\Sigma$ of the bandpass filter is coupled to the first stage $\tau_{C1}$ of a 454 stage shift register 22, and to an input of an adder 28. The shift regisfter 22 is clocked by an I/Q $CLOCK_F$ signal at a $2f_{sc}$ rate, producing codewords delayed by the scanning time of one horizontal television line at the output of the last stage $Y_{C454}$. Since the delayed codewords are to be subtractively combined with the undelayed codewords, the bits of the delayed codewords are complemented by inverting circuit 26, which inverts each individual codeword bit. The one's complemented delayed signal is then applied to a second input of adder 28, together with a "carry-in" least significant weight bit CI. The addition of the CI bit accomplishes a two's complementing of the delayed signal for proper subtraction of two's complement notation signals. The comb filtered signals at the output of adder 28 are latched into latch $L_{CF}$ by the I/Q CLOCK signal. Adder 28, like the adders of the bandpass filter, is assumed to exhibit a 40 nanosecond propagation delay. Thus, a comb filtered signal sample $I_{1CF}$ is produced at the output of latch $L_{CF}$ delayed by one cycle of the I/Q CLOCK with respect to corresponding signal sample $I_{1F}$, as shown by FIG. 6f. It is seen that filtered sample $I_{1F}$ is produced at time $t_9$ in FIG. 6e, whereas the corresponding comb filtered signal sample is produced at time $t_{10}$ in FIG. 6f.

FIG. 5 illustrates an interpolator suitable for use as interpolator 16 in the embodiment of FIG. 1. Any of a number of interpolation techniques may be employed to create a $4f_{sc}$ rate chrominance signal from the $2f_{sc}$ rate chrominance signal produced by the comb filter 20. The interpolator shown is a linear interpolator. This circuit may be replaced by a variety of polynomial interpolators depending on the particular transient response desired of the combed luminance signal. For a discussion of digital interpolation, see R. E. CROCHIERE and L. R. RABINER, "Interpolation and Decimation of Digital Signals—A Tutorial Review", Proc. of IEEE, Vol. 69, No. 3, March 1981, pp. 300-331. The interpolator of FIG. 5 implements an algorithm of the form $$-I = \frac{I_1 + I_0}{2}, -Q = \frac{Q_1 + Q_0}{2},$$

where $I_1$ and $Q_1$ are comb filtered chrominance samples $I_{1CF}$ and $Q_{1CF}$, and $I_o$ and $Q_o$ are comb filtered chrominance samples preceding samples $I_{1CF}$ and $Q_{1CF}$. A multiplexer then generates a combed chrominance data stream of the form $I_1$, $Q_1$, $-I_1$, $-Q_1$, at a $4f_{sc}$ rate.

In FIG. 5, the output of the comb filter latch $L_{CF}$ is coupled to two delay stages 80 and 81 which are clocked by the I/Q CLOCK signal, and to an input of an adder 82. The output of the second delay stage 81 is coupled to a second input of adder 82. The output of adder 82 is coupled to the input of an inverting circuit 84, the output of which is coupled to the input of a delay stage 86. Stage 86 is also clocked by the I/Q clock signal. The output of delay stage 86 is coupled to inputs of AND gates 96 and 98, and the output of comb filter latch $L_{CF}$ is coupled to inputs of AND gates 92 and 94. The second inputs of respective AND gates 92-96 are coupled to receive respective phase-shifted clock signals $I_4$, $Q_4$, $-I_4$ and $-Q_4$. The outputs of AND gates 92-96 are coupled to inputs of an OR gate 90 to form a multiplexer which produces a combed chrominance signal at a $4f_{sc}$ rate. The output of OR gate 90 is coupled to the data input of a D-type flip-flop 100 which has its clock input coupled to receive the $4F_{sc}$ clock signal.

The interpolator operates to form interpolated values $-I$ and $-Q$ by adding $I_{CF}$ and $Q_{CF}$ samples to previous $I_{CF}$ and $Q_{CF}$ samples, respectively, in adder 82. For instance, when the $L_{CF}$ latch is applying sample $I_{1CF}$ to one input of adder 82, the preceding sample $Q_{0CF}$ is held in stage 80 and the preceding sample $I_{0CF}$ is held in stage 81 and applied to the second input of the adder 82. The next I/Q clock cycle will apply samples $Q_{1CF}$ and $Q_{0CF}$ to the adder 82. The adder 82 thus produces consecutive codewords of the form $I_n+I_{n-1}+CI$ and $Q_n+Q_{n-1}+CI$, where CI is a carry-in bit. These codewords are of the same bit length as the input signals to the adder, but exclude the least significant adder output bit. That is, if the input signals to the adder are eight bits in length, the adder produces nine output bits, with the upper eight bits taken as the output codeword. This effects a division of the sum codeword by two. The bits of the adder codewords are then inverted, or one's complemented by the inverting circuit 84 which, together with the adder carry-in bit CI, effect a two's complementing of the codewords. Interpolated codewords $-I$ and $-Q$ according to the above algorithm are thus produced at the output of the inverting circuit. These codewords are then clocked sequentially into delay stage 86, which produces a sequence of interpolated codewords as shown in FIG. 6g.

The interpolated $-I$ and $-Q$ codewords and the comb filter output codewords are then multiplexed at a $4f_{sc}$ rate by AND gates 92-96 and OR gate 90. Referring to FIG. 6h, at time $t_{11}$ the $I_4$ clock applies codeword $I_{1CF}$ of FIG. 6f to OR gate 90 by way of AND gate 92. At time $t_{12}$, the $4f_{sc}$ clock signal loads this codeword into the D-type flip-flop 100, identified by the $I_1$ interval in FIG. 6i. At time $t_{13}$, codeword $Q_{1CF}$ of FIG. 6f is applied to OR gate 90 by the $Q_4$ clock signal applied to AND gate 94. At time $t_{14}$, this codeword is loaded into flip-flop 100 as shown by interval $Q_1$ in FIG. 6a. At time $t_{15}$, the $-I_1$ codeword held in stage 86 is applied to OR gate 90 by way of AND gate 96 and clock signal $-I_4$. At time $t_{16}$, the $-I_1$ codeword is loaded into flip-flop 100, and delay stage 86 is clocked to hold the $-Q_1$ interpolated codeword. At time $t_{17}$, the $-Q_1$ codeword is applied to OR gate 90 by way of AND gate 98 as enabled by the $-Q_4$ clock signal, and at time $t_{18}$ the $-Q$ codeword is loaded into flip-flop 100. Operation continues in this manner so that the $4f_{sc}$ signal sequence of FIG. 6i is produced at the output of flip-flop 100.

The $4f_{sc}$ chrominance signal sequence is then subtracted from the composite video signal by subtractor 18, which includes an inverting circuit 102 and an adder 104 as shown in FIG. 5. The bits of the chrominance codewords produced by flip-flop 100 are applied to inverting circuit 102 which, together with the carry-in bit CI of adder 104, accomplishes a two's complementing of the chrominance signal for subtraction. A second input of adder 104 is coupled to receive composite video signal codewords from delay stage 14, which in this embodiment is a five-stage shift register clocked by the $4F_{sc}$ clock signal. The delay stage 14 aligns codewords of the composite signal in time with corresponding chrominance signal codewords. Referring again to FIG. 6a, it will be remembered that codeword $I_1$ of the composite signal was located in center stage $\tau_4$ of the bandpass filter shift register 30 at time $t_1$. The corresponding $I_1$ chrominance codeword was not produced by flip-flop 100 until time $t_{12}$, as shown in FIG. 6i. From FIG. 6a, it is seen that a delay of nine cycles of the $4F_{sc}$ clock occurred between time $t_1$ and time $t_{12}$. Thus, delay stage 14 must delay the composite signal by nine cycles of the $4f_{sc}$ clock to bring the codewords into proper time sequence at the inputs of adder 104. Four cycles of this delay are provided by stages $\tau_5$, $\tau_6$, $\tau_7$ and $\tau_8$ of the bandpass filter shift register. The remaining five cycles of delay are provided by shift register stages $\tau_9$-$\tau_{13}$ in FIG. 5, which receive composite video codewords from shift register stage $\tau_8$ in FIG. 2. Therefore, the signal codewords are in a proper time sequence at the inputs of adder 104 so that the combined chrominance codewords are subtracted from the composite video signal codewords, producing a comb filtered luminance signal at the output of adder 104.

Figure 7:
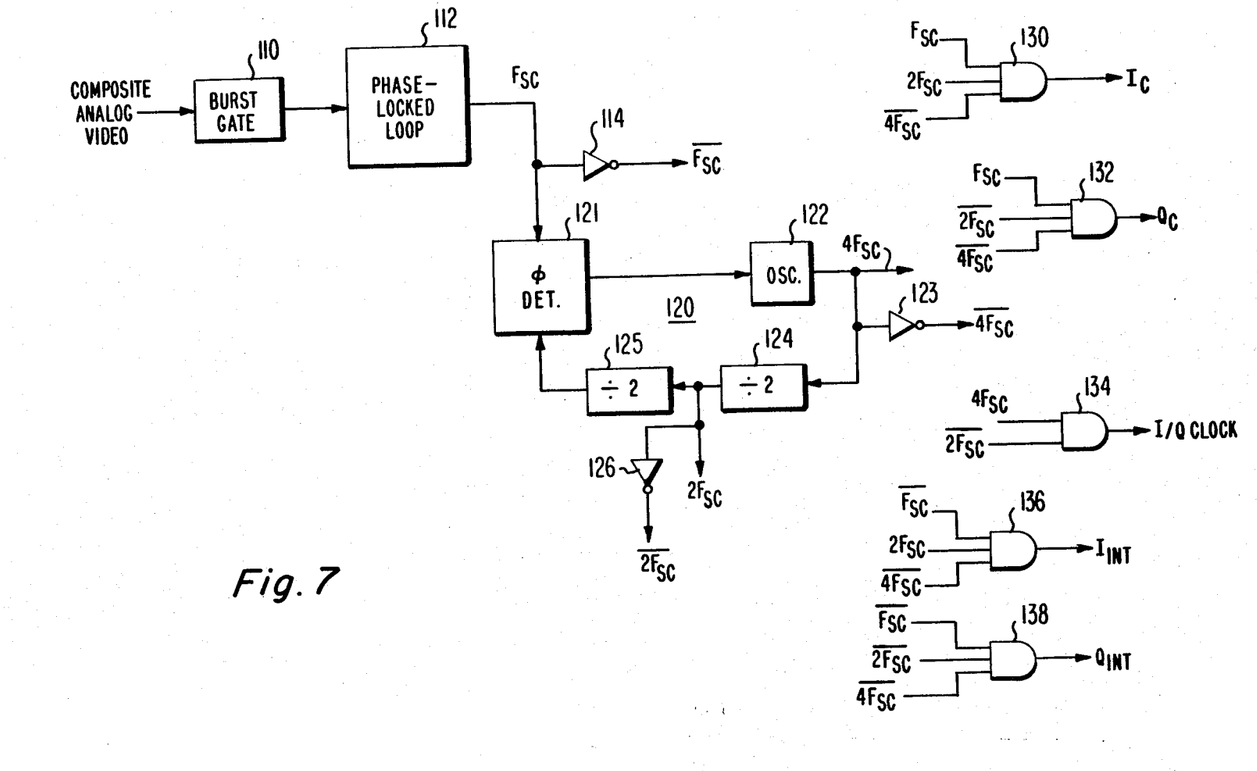
FIGS. 7 and 9 illustrate in block and logic diagram form a clock signal generating arrangement suitable for use with the arrangements of FIGS. 2, 4 and 5.
Figure 9:
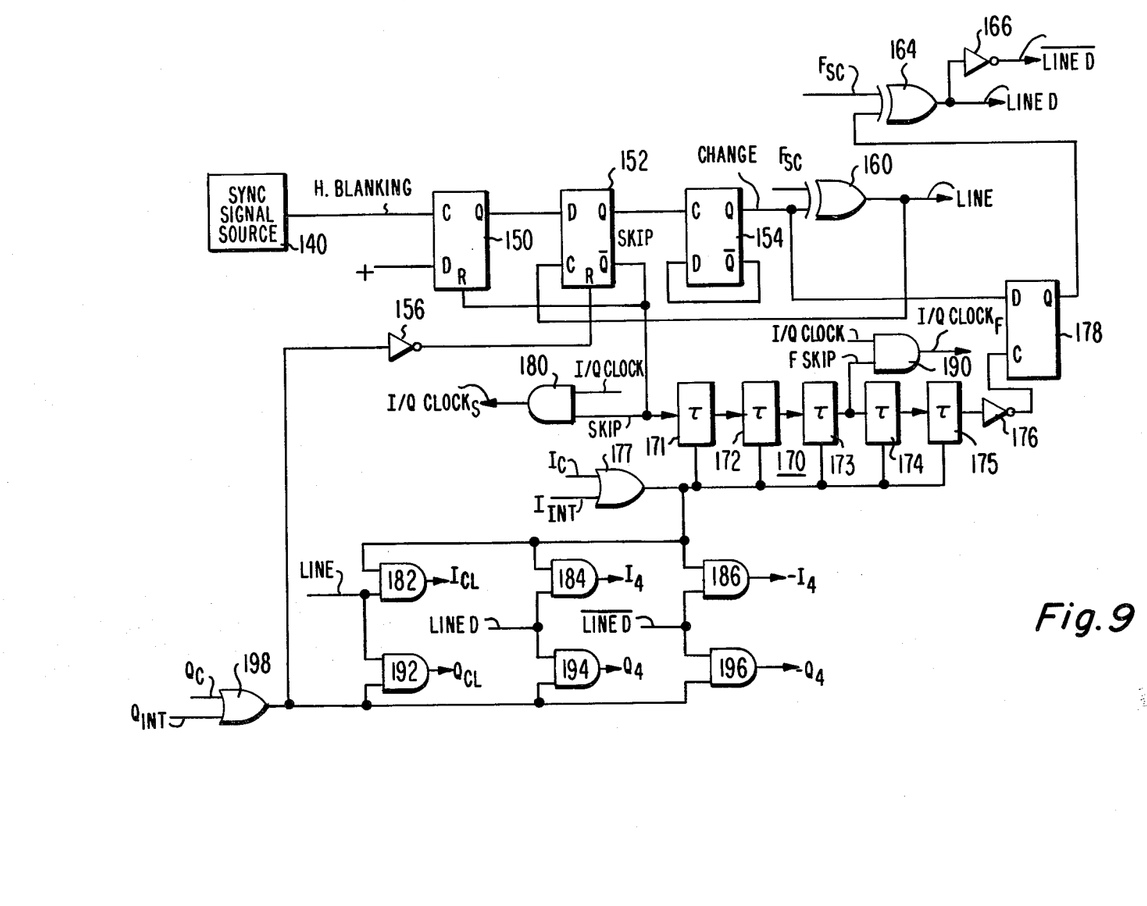

Necessary clock signals for the embodiments of FIGS. 1–5 are produced by the clock generating network of FIGS. 7 and 9. The composite analog video signal is applied to a burst gate 110 in FIG. 7, which gates the color burst signal to a phase-locked loop 112. The phase-locked loop 112 produces a signal $F_{sc}$ at the color subcarrier frequency phase locked with the color burst signal. An $F_{sc}$ signal waveform is shown in FIGS. 8a and 10a. For I, Q sampling a delay equal to 57° of the $F_{sc}$ signal is inserted at the output of the phase-locked loop 112 in which case the positive going transitions of the $F_{sc}$ waveforms of FIGS. 8a and 10a will be delayed 57° from the positive peaks of the color burst signal.

An inverter 114 is coupled to receive the $F_{sc}$ signal and produces a complementary signal $\overline{F_{sc}}$ at its output. The $F_{sc}$ signal is also applied to a phase detector 121 of a second phase-locked loop 120. The phase detector 121 produces a control signal to control the phase and frequency of an oscillator 122, which produces a $4F_{sc}$ signal at four times the color subcarrier frequency, as shown in FIG. 8b. The $4F_{sc}$ signal is applied to a divide-by-two circuit 124 and to an inverter 123, the latter producing a complementary $\overline{4F_{sc}}$ signal. The divide-by-two circuit 124 produces a $2F_{sc}$ signal at twice the subcarrier frequency, as shown in FIG. 8c. The $2F_{sc}$ signal is inverted by an inverter 126 to produce a complementary $\overline{2F_{sc}}$ signal. The $2F_{sc}$ signal is also applied to the input of a second divide-by-two circuit 125, which produces an $f_{sc}$ rate signal for the phase detector 121. Thus, the $F_{sc}$, $4F_{sc}$ and $2F_{sc}$ signals and their complements are maintained in substantial phase synchronism.

The $F_{sc}$, $2F_{sc}$ and $\overline{4F_{sc}}$ signals are applied to inputs of an AND gate 130 to produce pulses of an $I_C$ signal when all of the input signals are high, as shown in FIGS. 8d and 10c. Similarly, the $F_{sc}$, $\overline{2F_{sc}}$ and $\overline{4F_{sc}}$ signals are applied to inputs of an AND gate 132, which produces a $Q_C$ signal as shown in FIGS. 8e and 10d. The $4F_{sc}$ and $\overline{2F_{sc}}$ signals are applied to inputs of an AND gate 134, to produce an I/Q CLOCK signal, as shown in FIGS. 8f and 10g. The $\overline{F_{sc}}$, $2F_{sc}$ and $\overline{4F_{sc}}$ signals are applied to inputs of an AND gate 136 to produce clock signal $I_{INT}$, which is illustrated in FIGS. 8g and 10e. The $\overline{F_{sc}}$, $\overline{2F_{sc}}$ and $\overline{4F_{sc}}$ signals are applied to inputs of an AND gate 138 to produce clock signal $Q_{INT}$ as shown in FIGS. 8h and 10f. The I/Q CLOCK signal of FIG. 8f is seen to be in the proper phase alignment with the $4F_{sc}$ signal for operation of the bandpass filter, comb filter and interpolator of FIGS. 2, 4 and 5, and the $I_C$, $Q_C$, $I_{INT}$ and $Q_{INT}$ clock signals are seen to be in the quadrature phase relationship required by the multiplexer of the interpolator of FIG. 5. The clock signals of FIG. 8 are also in the same timing relationships as the signal waveforms of FIG. 6.

By reason of the odd multiple frequency relationship between the line scanning (horizontal synchronizing) frequency and the color subcarrier ($f_{sc}$) frequency, codeword samples on one video line of information are of opposite phase with respect to vertically aligned samples on succeeding and preceding lines. That is, if the first codeword on one line is a +I sample, the first codeword on the next line is a −I sample. This relationship, which underlies the principle of comb filtering, requires that the phases of the $f_{CL}$ and $Q_{CL}$ clock signals be changed from line-to-line so that +I and +Q samples will be selected on one line and combined with vertically aligned −I and −Q samples on the next line. In addition, the interpolator must be operated so that, on the first line, −I and −Q samples are interpolated to fill in between the +I and −Q samples, and that +I and +Q samples are interpolated to fill in between the −I and −Q samples on the following line.

Clock circuitry which performs the necessary phase shifts of the clock signals is shown in FIG. 9. In FIG. 9, a synchronizing signal source 140 produces a horizontal blanking signal, which is applied to the clock input of a D-type flip-flop 150. The data input of flip-flop 150 is coupled to a source of logical one level voltage (+). The Q output of flip-flop 150 is coupled to the data input of a D-type flip-flop 152. The Q output of flip-flop 152 is coupled to the clock input of a D-type flip-flop 154, and the $\overline{Q}$ output of flip-flop 152 is coupled to the reset input R of flip-flop 150, and input of an AND gate 180, and to the input of the first stage 171 of a SKIP signal delay line 170. The Q output of flip-flop 154 is coupled to an input of an exclusive-OR gate 160, and to the data input of a D-type flip-flop 178. The $\overline{Q}$ output of flip-flop 154 is coupled to the data input of flip-flop 154. The second input of exclusive-OR gate 160 is coupled to receive the $F_{SC}$ clock signal, and produces a signal LINE at its output. The LINE signal is applied to the clock input of flip-flop 152.

The SKIP signal delay line 170 includes five serially coupled delayed stages 171–175, which are clocked by pulses of the $I_C$ and $I_{INT}$ clock signals applied by an OR gate 177. The output of the third delay stage 173 is coupled to one input of an AND gate 190, which receives the I/Q CLOCK signal at its other input. The AND gate 190 produces an output signal identified as I/Q CLOCK$_F$. The output of the last delay stage 175 is coupled to the clock input of flip-flop 178 by an inverter 176. The Q output of flip-flop 178 is coupled to one input of an exclusive-OR gate 164, which is also coupled to receive the $F_{SC}$ clock signal. The exclusive-OR gate 164 produces a signal LINED, which is also produced in inverted form by an inverter 166.

The AND gate 180 is coupled to receive the I/Q CLOCK signal at its second input, and produces an output signal identified as I/Q CLOCK$_S$.

Three AND gates 182, 184 and 186 each have an input to the output of OR gate 177. The LINE signal is applied to a second input of AND gate 182, which produces the $I_{CL}$ clock signal for the $L_I$ latches of the bandpass filter as its output. The LINED signal is applied to the second input of AND gate 184, which produces the $I_4$ signal for the intepolator at its output. The $\overline{\text{LINED}}$ signal is applied to the second input of AND gate 186, which produces the $-I_4$ clock signal for the interpolator at its output.

Three AND gates 192, 194 and 196 each have an input coupled to the output of an OR gate 198. The OR gate 198 is coupled to receive the $Q_C$ clock signal at one input and the $Q_{INT}$ clock signal at a second input. The LINE signal is applied to a second input of AND gate 192 to produce the $Q_{CL}$ clock signal for the $L_Q$ latches of the bandpass filter. The LINED signal is applied to the second input of AND gate 194, which produces the $Q_4$ signal for the interpolator at its output. The $\overline{\text{LINED}}$ signal is applied to the second input of AND gate 196 to produce the $-Q_4$ signal for the interpolator. The output of OR gate 198 is also coupled by way of an inverter 156 to the reset input R of flip-flop 152.

The operation of the clock signal circuitry of FIG. 9 may be understood by first assuming that flip-flops 150, 152 and 154 are all in a reset condition. With flip-flop 154 being reset, the LINE signal at the output of exclusive-OR gate 160 will be in phase with the $F_{SC}$ signal, as seen by comparing pulse 200 of FIG. 10b with pulse 202 of FIG. 10k. The pulses of the LINE signal of FIG. 10k gate pulses 204 and 206 of the $I_C$ and $Q_C$ signals (FIGS. 10c and 10d) to the $L_I$ and $L_Q$ resistors 40 of the bandpass filter by way of AND gates 182 and 192 to selectively load the latch registers at these times. This timing will load the latch register 40 at the times of occurrence of +I and +Q signal codewords of the incoming codeword sequence, as seen by comparing FIGS. 10b and 10c with the codeword sequence shown in FIG. 10a. When the video signal is sampled by the A/D converter 10 at a $4f_{SC}$ rate, each horizontal line of an NTSC signal will be represented by 910 codeword samples. The LINE signal will thus load the latch register 40 during the times of occurrence of the first and second codewords of each group of four codewords, including the 905th and 906th samples shown in FIG. 10a.

The 910 codewords of one line of the NTSC signal are aligned in time with 227½ cycles of the $F_{SC}$ signal of FIG. 10a. In order to operate the comb filter 20 substantially at a $2f_{SC}$ rate and to comb filter by combining vertically aligned samples from line-to-line, the extra half line of samples, shown as 909 and 910 in FIG. 10a, are deleted from the comb filtering process. At this time, the phase of the LINE signal is reversed to select samples of opposite polarity of the new line for the comb filter. This results in a 454 stage comb filter 22 as shown in FIG. 4.

Figure 10:
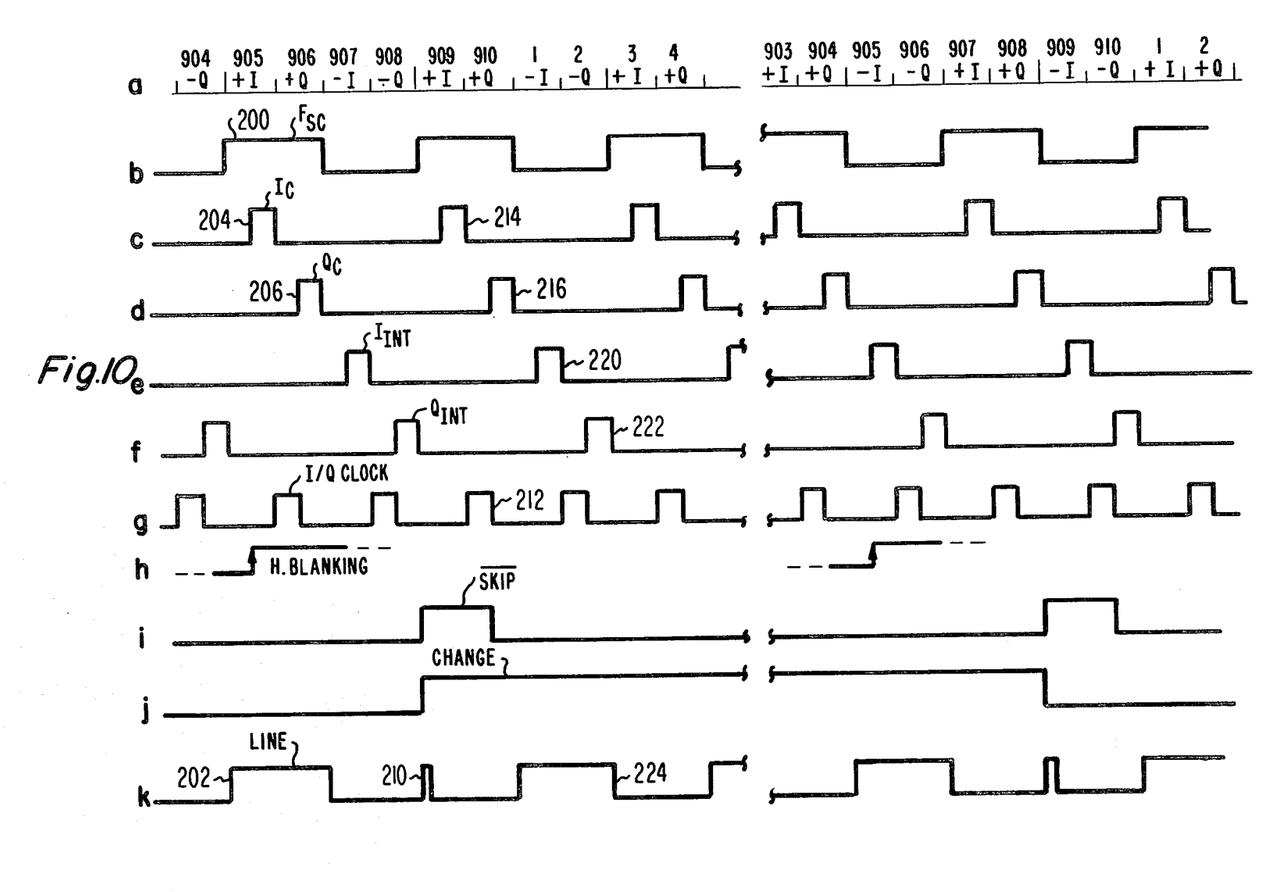

The phase change is initiated by the leading edge of the horizontal blanking signal shown in FIG. 10h, which sets flip-flop 150. The leading edge of the horizontal blanking signal is illustratively shown in FIG. 10 to occur during codeword 905 of FIG. 10a where FIG. 10a represents the codeword sequence at the stage $\tau_4$ (center tap) of the bandpass filter. Flip-flop 150 applies a high signal to the data input of flip-flop 152, which is then set by the next leading edge 210 of the LINE signal, as shown in FIG. 10k. The Q output of flip-flop 152 produces a $\overline{SKIP}$ pulse, shown in FIG. 10a, which clocks flip-flop 154 to a set condition. The Q output of flip-flop 154, labelled CHANGE, changes state as shown in FIG. 10j, which changes the phase of the LINE signal, as shown in FIG. 10k. The LINE signal is now low during the occurrence of $I_C$ and $Q_C$ pulses 214 and 216, preventing loading of the latches 40 during samples 909 and 910 of FIG. 10a. In addition, the SKIP pulse at the $\overline{Q}$ output of flip-flop 152 blocks the passage of I/Q CLOCK pulse 212 of FIG. 10g through AND gate 180 so that the multiplexer 50 of FIG. 2 will not change state during codewords 909 and 910. The SKIP pulse also resets flip-flop 150, and is loaded into the first stage 171 of the SKIP signal delay line 170 by $I_C$ clock pulse 214. Flip-flop 152 is reset by $Q_C$ clock pulse 216, thus terminating the SKIP and $\overline{SKIP}$ pulses.

The new phase of the LINE signal will now load the latch registers 40 during the occurrence of −I and −Q samples. LINE pulse 224, for instance, will gate $I_{INT}$ and $Q_{INT}$ pulses 220 and 222 of FIGS. 9e and 9f to the latch registers by way of AND gates 182 and 192. Pulses 202 and 222 are seen to be coincident with −I sample 1 and −Q sample 2 of the new line of codewords. These codewords are vertically aligned with +I sample 1 and +Q sample 2 of the previous horizontal line.

It is remembered from FIGS. 6d and 6e that two cycles of the I/Q CLOCK signal are required for the multiplexed signals to propagate through the bandpass filter of FIG. 2 to the filter output latch $L_\Sigma$. Since no samples were loaded into the latches 40 of the filter during sample times 909 and 910, it is necessary to prevent operation of the $L_\Sigma$ latch at the time at which samples from times 909 and 910 would be expected to appear at the input of latch $L_\Sigma$. This is accomplished by the SKIP signal delay line, which clocks the SKIP signal to the output of stage 173 at this time. This signal, termed FSKIP in FIG. 9, prevents the passage of an I/Q CLOCK pulse through AND gate 190 so that the $L_\Sigma$ latch, which is clocked by signal I/Q $CLOCK_F$, is not latched when filtered codeword 909 would be expected to appear at the output of the bandpass filter. The I/Q $CLOCK_F$ signal also clocks the comb filter delay line 20 of FIG. 4, which similarly skips a clock cycle at this time.

After two more I/Q CLOCK cycles, the skipped codeword interval will have reached the interpolator 16 of FIG. 5. This requires a change of the phase of the $I_4$, $Q_4$, $-I_4$ and $-Q_4$ clocks of the interpolator. The SKIP pulse at this time is clocked to the output of the last stage 175 of the SKIP signal delay line 170. The SKIP pulse is inverted and clocks flip-flop 178 to load the CHANGE signal level into flip-flop 178. The CHANGE signal level then reverses the phase of the LINED and $\overline{LINED}$ signals at the outputs of exclusive-OR gate 164 and inverter 166, respectively. The LINED and $\overline{LINED}$ signals control AND gates 184, 194, 186 and 196, which generate the $I_4$, $Q_4$, $-I_4$, and $-Q_4$ clock signals. During the previous line, the $I_4$ signal and the $Q_4$ signal were in phase with $I_C$ and $Q_C$ clock signals to gate comb filtered +I and +Q signals through the interpolator gate 90. The $-I_4$ and $-Q_4$ signals were in phase with the $I_{INT}$ and $Q_{INT}$ clock signals to gate interpolated −I and −Q signals through gate 90. With the reversal of phase of the LINED and $\overline{LINED}$ signals, the $I_4$ and $Q_4$ clock signals will now be in phase with the $I_{INT}$ and $Q_{INT}$ clock signals to gate comb filtered −I and −Q samples through the interpolator, and the $-I_4$ and $-Q_4$ clock signals are in phase with the $I_C$ and $Q_C$ clock signals to gate interpolated +I and +Q samples through gate 90. The interpolator will therefore gate properly phased samples to subtractor 18 for comb filtering of the luminance signal.

The right-hand waveform of FIG. 10 show that similar clock signal phase reversals occur at the end of the new horizontal line, during which time the CHANGE signal of FIG. 10j is changed to its reset condition.

Analysis of the illustrated embodiment of the present invention has shown that erroneous interpolated codewords are produced at the time of clock phase changes from one line to the next. This is because codewords of one line are combined with improper codewords of the adjacent line by the interpolator. Specifically, the last two interpolated codewords of the ending line and the first two interpolated codewords of the new line will be in error, which span a time interval of six $4F_{SC}$ clock cycles, beginning at the changing of the CHANGE signal of FIG. 10j. By comparing FIG. 10h with FIG. 10j and FIG. 10a, it is seen that approximately four codeword intervals (i.e., four $4F_{SC}$ clock cycles) occur between the leading edge of horizontal blanking and the change of the CHANGE signal. Thus, a total of ten cycles of the 4$F_{SC}$ clock pass between the leading edge of the horizontal blanking pulse and the time at which a steady stream of correct codewords resumes. In the NTSC system, this is a time interval of approximately 700 nanoseconds. Since the "front porch" of the horizontal blanking interval which precedes the horizontal sync pulse has a minimum duration of approximately 1.27 microseconds, it is seen that the erroneous codewords will have passed through the system before the time of occurrence of the horizontal sync pulse, which is the next video information signal which must be accurately reproduced.

Moreover, by effecting the clock phase reversal during the beginning of the horizontal blanking interval, the changeover occurs during a time at which no chrominance information is being transmitted. Thus, the outputs of the bandpass filter and the comb filter will contain substantially no chrominance signal information and essentially zero level signals will be produced by the comb filter. The interpolation process will then be performed entirely with zero level signals and will cause no erroneous results when the zero level signals are introduced into the luminance channel for luminance signal combing.

An important aspect of the present invention is the ability to comb filter the chrominance signals at a sampling frequency which is less than the sampling frequency of the A/D converter. In the embodiment of FIG. 4, the comb filter sampling frequency is 2$f_{sc}$, or approximately 7.16 MHz in the NTSC system. Since the NTSC chrominance signal bandwidth extends from approximately 2.1 MHz to 4.2 MHz, it would ordinarily be anticipated that sampling at 7.16 MHz would cause aliasing around the 3.58 MHz color subcarrier frequency. Note, however, that each of the processed samples was originally sampled at a rate that satisfies the Nyquist criterion and from line to line corresponding samples have a precise phase relationship. If the combing function is evaluated in the time domain, it is recognized that the samples of one line are subtracted from corresponding samples of an adjacent line samples at precisely the same point in their respective lines.

Like components of luminance signal occurring in the band passed samples of adjacent lines are removed by the subtractive process. Further, with respect to the chrominance component of the band passed samples, because the subsampling clocks are locked to the chrominance carrier, the aliasing concept in general does not apply. Sampling the modulated carrier, at the carrier frequency, at the same phase position each cycle satisfies the Nyquist criterion with respect to the chrominance signal and aliasing components are not generated.

What is claimed is:

1. In a television signal processing system, including a source of sampled data video signals at a given data rate having first and second interleaved signal components in a passband which are to be separated, a comb filter system comprising:

means, having an input coupled to said signal source, and an output, for passing said sampled data video signals at a reduced data rate which is less than said given data rate over a portion of said passband; and a comb filter, having an input coupled to the output of said reduced data rate signal passing means, and operated at said reduced data rate for producing a comb filtered output signal.

2. In a television signal processing system, including a source of sampled data video signals at a given data rate having first and second interleaved signal components in a passband which are to be separated, a comb filter system comprising:

means, having an input coupled to said signal source, and an output, for passing said sampled data video signals at a reduced rate which is less than said given data rate over a portion of said passband;

a comb filter, having an input coupled to the output of said reduced data rate signal passing means, and operated at said reduced data rate for producing a first comb filtered output signal at said reduced data rate;

an interpolator having an input coupled to receive said first comb filtered signal and an output at which a replica of said first comb filtered signal is produced at said given data rate; and means, having a first input coupled to said signal source to receive said sampled data video signals, a second input coupled to receive said replica of said first comb filtered signal, and an output, for combining said received signals to produce a second comb filtered signal.

3. The arrangement of claim 1 or 2, wherein said reduced data rate signal passing means comprises:

means for subsampling said video signals at a reduced rate which is less than said given data rate; and a bandpass filter responsive to said subsampled video signals for passing reduced rate filtered signal samples occupying a portion of said passband.

4. The arrangement of claim 2, wherein said first and second interleaved signal components comprise chrominance and luminance information signals; said first comb filtered output signal comprises a comb filtered chrominance signal; and wherein said combining means comprises means for subtractively combining said sampled data video signals and said comb filtered chrominance signal to produce a comb filtered luminance signal.

5. A system for comb filtering sampled data signals occurring at a given rate and including first and second frequency interleaved signal components comprising:

means for selecting prescribed ones of said sampled data signals and producing a signal having a rate reduced from said given rate, said reduced rate satisfying the Nyquist criterion for sampled signals with respect to at least one of said first and second components;

a comb filter operating at said reduced rate and responsive to said selected samples for producing a first combed manifestation of said selected samples;

an interpolator responsive to said first comb filtered signal for producing a comb filtered signal at said given rate; and means for combining the combed filtered signal from the interpolator and the sampled data signals to produce a second comb filtered signal, wherein said first and second comb filtered signals correspond substantially to said first and second signal components, respectively.

6. In a television signal processing system, including a source of sampled data video signals at a given data rate having first and second frequency interleaved signal components which are to be separated, wherein one video line interval comprises a given number of signal samples; a comb filter system comprising:

means, having an input coupled to said signal source, and an output for producing sample data video signals in response to a subsampling signal which includes said first and second interleaved signal components at a reduced rate which is less than said given rate, with one video line interval comprising a reduced number of signal samples which is not an integer submultiple of said given number;

a comb filter, including a delay line, and responsive to said reduced rate sampled data video signals for producing a comb filtered output signal; and means for changing the phase of said subsampling signal from one video line interval to another.

7. In a television receiver, including a source of analog video signals occupying a given passband and having first and second frequency interleaved signal components, a signal separation system comprising:

an analog to digital converter, responsive to a sampling clock signal, for producing a sequence of digital video signal samples in response to said sampling clock signal;

a bandpass filter, having an input responsive to said sequence of digital video signal samples for sampling said sequence at first and second phases of a subsampling clock signal and producing filtered signal samples at a reduced rate relative to said input sequence which occupy a portion of said given passband;

a comb filter including a shift register and a first signal combining circuit responsive to said reduced rate filtered signal samples, said first signal combining circuit being further responsive to delayed filtered signal samples provided by said shift register for producing a first comb filtered signal sequence at said reduced rate at an output which corresponds to said first frequency interleaved signal components;

an interpolator having an input coupled to the output of said comb filter and responsive to said first comb filtered signal sequence for generating interpolated signals therefrom and producing a replica of said first comb filtered signal sequence at the rate of said input sequence; and a second signal combining circuit having a first input responsive to said replica of said first comb filtered signal sequence, a second input responsive to said sequence of digital video signal samples produced by said analog to digital converter, and an output at which a second comb filtered signal sequence corresponding to said second interleaved signal components is produced.

8. The arrangement of claim 7, further comprising:

a second shift register, coupled between said analog to digital converter and said second input of said second signal combining circuit for providing an equalizing delay to said sequence of digital video signal samples produced by said analog to digital converter.

9. The arrangement of claim 7 or 8, wherein said sampling clock signal and said subsampling clock signal are aligned in phase with the color subcarrier of said video signals, said first signal combining circuit is a subtractive signal combining circuit which produces a comb filtered chrominance signal sequence, and said second signal combining circuit is a subtractive signal combining circuit which produces a comb filtered luminance signal sequence.

10. The arrangement of claim 7 or 8 further comprising:

means for producing a sampling clock signal containing sampling pulses produced at first, second, third and fourth phases of the color subcarrier signal component of said video signals;

wherein said analog to digital converter is responsive to said sampling clock signal; and means for producing first and second subsampling clock signals containing subsampling pulses corresponding to said first and second phases, wherein said bandpass filter is responsive to said subsampling clock signals.

11. The arrangement of claim 10, further comprising means for producing a third subsampling clock signal at a reduced rate relative to said sampling clock signal and in phase alignment therewith, wherein said comb filter is responsive to said third subsampling clock signal.

12. The arrangement of claim 10, wherein said means for producing said first and second subsampling clock signals further includes means for producing third and fourth subsampling clock signals containing subsampling pulses corresponding to said third and fourth phases, wherein said bandpass filter is responsive to said first and second subsampling clock signals during a first video line, and to said third and fourth subsampling clock signals during a second, succeeding video line.

* * * * *